March 29, 1966     M. E. BROGDEN ETAL     3,243,466
DINITROTOLUENE PROCESS
Filed Dec. 28, 1964
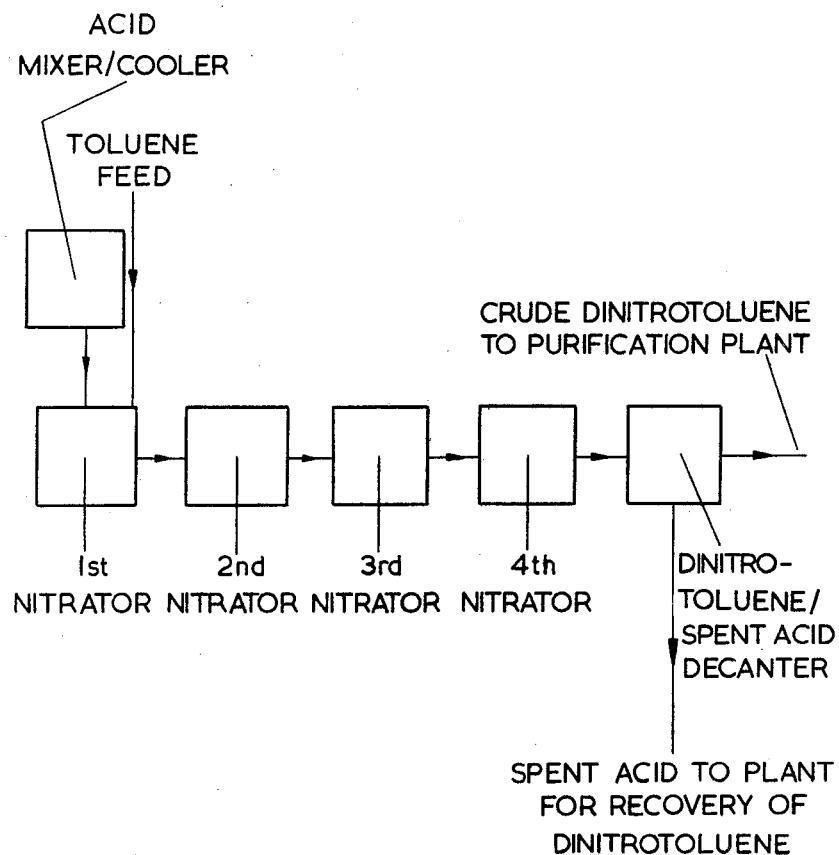
INVENTORS
MICHAEL EDWARD BROGDEN
GEORGE MILNES
HARRY PINKERTON
By Cushman, Darby & Cushman
ATTORNEYS

United States Patent Office 3,243,466
Patented Mar. 29, 1966

---

3,243,466
DINITROTOLUENE PROCESS
Michael Edward Brogden, George Milnes, and Harry Pinkerton, all of Manchester, England, assignors to Imperial Chemical Industries Limited, London, England, a corporation of Great Britain
Filed Dec. 28, 1964, Ser. No. 421,393
Claims priority, application Great Britain, Jan. 8, 1964, 830/64
3 Claims. (Cl. 260—645)

This invention relates to the manufacture of dinitrotoluene.

According to the present invention we provide a continuous process for the manufacture of dinitrotoluene from toluene characterised in that the nitration is conducted in several vessels arranged in series, the toluene and all the mixed nitric and sulphuric acid required to convert the toluene to dinitrotoluene being introduced into the first of the vessels, the mixed acid initially containing from 5.0% to 20% by weight of water and the sulphuric acid remaining at the completion of nitration containing from 15% to 25% by weight of water and preferably about 20% of water.

It is preferred that the nitration be conducted above 60° C. and at not more than 70° C. preferably about 65° C. employing from 2.01 to 2.30 moles of nitric acid per mole of toluene. From two to six vessels may conveniently be employed in the process of the invention and preferably four vessels.

The water content of the mixed acid employed for nitration and the water content of the spent acid as specified above determine the relative strengths and quantities of the acids employed allowing for the fact that there is an almost theoretical usage of nitric acid with formation of an equivalent amount of water. Examples of suitable mixture of acids are listed below:

| | Percent w/w $HNO_3$ | Percent w/w $H_2O$ | Percent w/w $H_2SO_4$ |
|---|---|---|---|
| (a) Using 93% $H_2SO_4$ and 60% $HNO_3$ to give spent acid of 75% $H_2SO_4$ | 17.7 | 16.8 | 65.5 |
| (b) Using 40% oleum and 70% $HNO_3$ to give spent acid of 85% $H_2SO_4$ | 25.2 | 5.04 | 69.75 |

Usually it is preferred for convenience to use a mixture of 69% nitric acid with 25% oleum, the final mixture containing 8.9% of water.

The process of the invention may be carried out in apparatus such as that represented in the flow diagram shown in the accompanying drawing. Referring to the drawing a pipe from the acid mixer/cooler is connected to the first of a series of four nitration vessels. The first vessel is provided with a separate inlet for toluene and an outlet leading to the second nitrator, which in turn leads to the third and fourth nitrators. All the nitrators are fitted with cooling coils and agitators. The last of the series of nitrators has an inlet to a decanter, from which separate connections lead to a plant for purifying the crude dinitrotoluene mixture and a plant for recovering dinitrotoluene contained in the spent acid.

In operating the process of the invention metered streams of nitric acid and sulphuric acid are led to the mixer/cooler which is provided with means to remove the heat generated during mixing of the acids. The mixed acids flow directly to the first nitrator, where, when steady conditions are established, the acid and the toluene feed are fed underneath the surface of the nitration mixture already present therein. The overflow of nitration mixture from the first nitrator passes to the second nitrator, then to the third nitrator and finally to the fourth nitrator where nitration is completed. The overflow from the fourth nitrator passes to the decanter where the hot dinitrotoluene phase is separated continuously from the spent acid phase. The hold-up volume of reaction mixture in the nitrators is such as to allow sufficient residence time for substantially complete dinitration of the toluene, for example a residence time of about 1 hour in the first nitrator and about ¼ hour in each of the other nitrators. The toluene is completely mononitrated and about 90% dinitrated in the first nitrator.

Using the preferred reaction conditions it is found that the proportion of 2:4-dinitrotoluene to 2:6-isomer is higher than that produced in conventional dinitation processes, and that the mixture of diisocyanates obtained by phosgenation of the derived diamines has especially valuable properties.

A preferred embodiment of the present invention is illustrated in the following example:

*Example*

3586 lb./hr. mixed acid of composition 63.85% $H_2SO_4$, 27.3% $HNO_3$, 8.85% $H_2O$ at 60° C. is fed together with 697 lb./hr. toluene to the first of four nitrators in series. The temperature of each nitrator is controlled at 65±1° C. The hold-up volume is 120 gallons in the first nitrator and 100 gallons in each of the second, third and fourth nitrators. Intense agitation is provided in each nitrator. Dinitrotoluene having 2:4/2:6-isomer ratio of about 81/19 is obtained from the nitration mass from the fourth nitrator after separation from the spent acid and washing to remove residual acid and other impurities. Spent acid from the nitration mass contains 20.3% water and 0.7% nitric acid.

What we claim is:

1. A continuous process for the manufacture of dinitrotoluene from toluene in a series of stirred nitration vessels, said process comprising continuously passing into a first vessel toluene and a mixture of nitric and sulphuric acids containing 5–20% of water, passing the resultant mixture from the first vessel successively into and through the other vessels of the series and separating the resultant dinitrotoluenes from the spent acid, the temperature in all the vessels being between 60° and 70° C., the amount of nitric acid used being from 2.01 to 2.3 moles per mole of toluene and the sulphuric acid remaining at the completion of nitration containing 15%–25% by weight of water.

2. The process of claim 1 wherein said series of stirred nitration vessels consists of 2 to 6 vessels.

3. Process according to claim 2 wherein the reaction mixture has a residence time of about one hour in the first vessel and about one-quarter hour in each of the other vessels.

References Cited by the Examiner

UNITED STATES PATENTS 3,160,669  12/1964  Terao et al. ——————— 260—645

FOREIGN PATENTS 939,873  10/1963  Great Britain.

OTHER REFERENCES

De La Mare and Ridd: Aromatic Substitution Nitration and Halogenation, Academic Press Inc., New York, 1959, page 50.

LEON D. ROSDOL, *Primary Examiner.*
CARL D. QUARFORTH, *Examiner.*
L. A. SEBASTIAN, *Assistant Examiner.*